(12) United States Patent
Carducci

(10) Patent No.: US 12,104,340 B2
(45) Date of Patent: Oct. 1, 2024

(54) SYSTEM AND METHOD OF SNOW CONVERSION

(71) Applicant: Jerry Carducci, Grosse Ile, MI (US)

(72) Inventor: Jerry Carducci, Grosse Ile, MI (US)

(*) Notice: Subject to any disclaimer, the term of this patent is extended or adjusted under 35 U.S.C. 154(b) by 650 days.

(21) Appl. No.: 17/340,194

(22) Filed: Jun. 7, 2021

(65) Prior Publication Data

US 2022/0389675 A1 Dec. 8, 2022

(51) Int. Cl.
*E01H 10/00* (2006.01)
*E01H 5/04* (2006.01)
*E01H 5/10* (2006.01)
*E01H 5/06* (2006.01)

(52) U.S. Cl.
CPC ............ *E01H 10/007* (2013.01); *E01H 5/045* (2013.01); *E01H 5/102* (2013.01); *E01H 5/108* (2013.01); *E01H 5/061* (2013.01)

(58) Field of Classification Search
CPC ........... E01H 5/10; E01H 5/102; E01H 5/104; E01H 5/106; E01H 5/108
USPC ..... 8/8; 4/2, 23; 37/199, 225, 226, 228, 229
See application file for complete search history.

(56) References Cited

U.S. PATENT DOCUMENTS

| 999,445 | A | * | 8/1911 | Friedman | ............... | E01H 5/104 |
| | | | | | | 37/305 |
| 1,242,433 | A | * | 10/1917 | Friedman | ............... | E01H 5/104 |
| | | | | | | 198/522 |
| 2,104,363 | A | * | 1/1938 | Devlin | ................... | E01H 5/104 |
| | | | | | | 126/343.5 R |
| 2,877,762 | A | * | 3/1959 | Flynn | ..................... | E01H 5/104 |
| | | | | | | 126/343.5 R |
| 3,259,123 | A | * | 7/1966 | Sangivanni | ............. | E01H 5/098 |
| | | | | | | 37/227 |
| 5,365,681 | A | * | 11/1994 | Miranda | .................. | E01H 5/104 |
| | | | | | | 37/227 |
| 6,305,105 | B1 | * | 10/2001 | Lowman | ................. | E01H 5/104 |
| | | | | | | 37/228 |
| 6,558,351 | B1 | * | 5/2003 | Steil | ..................... | A61B 5/7242 |
| | | | | | | 604/522 |
| 10,024,012 | B1 | * | 7/2018 | Williams | ................ | E01H 5/104 |
| 10,280,576 | B1 | * | 5/2019 | Osorio | .................... | E01H 5/106 |
| 2004/0074114 | A1 | * | 4/2004 | Rogers | .................... | E01H 5/104 |
| | | | | | | 37/228 |
| 2008/0178866 | A1 | * | 7/2008 | Davies | .................... | E01H 5/102 |
| | | | | | | 126/343.5 R |

(Continued)

*Primary Examiner* — Jamie L McGowan
*Assistant Examiner* — Audrey L Lusk
(74) *Attorney, Agent, or Firm* — Quinn IP Law

(57) ABSTRACT

A snow conversion system for removal of snow from an access surface includes a mixing tank and a conveyor apparatus fluidly connected to the mixing tank for transferring the snow from the access surface into the mixing tank. The system also includes a fluid delivery arrangement for injecting a chemical agent into the mixing tank to combine the chemical agent with the transferred snow and thereby generate a solution of the melted snow and the chemical agent. The system additionally includes a mixer for agitating and mixing the snow and the injected chemical agent in the mixing tank to thereby further facilitate melting of the snow in the mixing tank. The system further includes a fluid nozzle in fluid communication with the mixing tank for dispensing the solution of the melted snow and the chemical agent onto the access surface to thereby provide de-icing and/or anti-icing of the access surface.

13 Claims, 5 Drawing Sheets

(56) References Cited

U.S. PATENT DOCUMENTS

2014/0305010 A1* 10/2014 Fonseca .................. E01H 5/104
　　　　　　　　　　　　　　　　　　　　　　　　　　37/228
2017/0152639 A1*  6/2017 Cho ........................ E01H 5/106
2020/0370258 A1* 11/2020 Noland ................... E01H 5/108
2020/0399843 A1* 12/2020 Passmore ............... B60Q 9/008

* cited by examiner

SYSTEM AND METHOD OF SNOW CONVERSION

INTRODUCTION

The disclosure relates to a snow conversion system and method, specifically for clearing, removal, and melting of snow.

In many climates, arrival of winter brings snowfall, which may result in significant accumulation. When snow falls and accumulates at a property, snow clearing and is necessary to make commercial and residential building and parking lot access convenient and safe. When the snow really piles up, clearing the snow away from building structures may also be important to their longevity and integrity. At the beginning of winter, when snowfall may be light, snow removal is typically a relatively simple service. However, as the season progresses, snow may accumulate, and with the addition of ice may create slippery, unsafe surfaces.

Snow must generally be cleared from access surfaces, such as parking lots, driveways, and sidewalks, and moved to designated areas. Snow clearing and removal may be done by individual households, governments, and institutions. Specially adapted vehicles are frequently used to remove snow from drive lanes, entrances, handicap parking, and other vital areas to keep property safe and open. With changes in temperatures, ice may form and make commonly used surfaces dangerous to pedestrians, causing people to slip and fall, and may also cause cars to lose control and crash into residential and commercial structures. Accordingly, in addition to parking lots, driveways, and sidewalks being cleared of snow, these areas are also frequently anti- and de-iced.

De-icing is defined as removal of existing snow, ice or frost from a particular surface. De-icing may include both mechanical means, such as plowing or scraping, and chemical means, such as application of salt or other ice-melting chemicals. Anti-icing is a treatment using ice-melting chemicals before or during the onset of a storm to prevent or delay the formation and adhesion of ice and snow to the affected surface. In commercial settings, timely professional plowing, de-icing, and proactive salting is used to prevent refreeze are typically used to keep walkways and sidewalks clear to keep employees and customers safe, and businesses operational.

SUMMARY

A snow conversion system for removal of snow from an access surface, e.g., parking lots, driveways, drive lanes, entrances and sidewalks, includes a mixing tank. The system also includes a conveyor apparatus fluidly connected to the mixing tank and configured to transfer the snow from the access surface into the mixing tank. The system additionally includes a fluid delivery arrangement configured to inject a chemical agent into the mixing tank to combine the chemical agent with the transferred snow and thereby generate a solution of the melted snow and the chemical agent. The system also includes a mixer configured to agitate and mix the transferred snow and the injected chemical agent in the mixing tank and thereby further facilitate melting of the snow in the mixing tank. The system further includes a fluid nozzle in fluid communication with the mixing tank and configured to dispense the solution of the melted snow and the chemical agent onto the access surface to thereby provide de-icing and/or anti-icing of the access surface.

The mixing tank may include an auxiliary heating element configured to add thermal energy to the solution of the melted snow and chemical agent and thereby enhance a rate of melting of the snow in the mixing tank.

The chemical agent may be condensed magnesium chloride.

The snow conversion system may additionally include an auxiliary injection arrangement configured to inject iron oxide into the mixing tank to react with magnesium in the injected magnesium chloride. Such injection of iron oxide into the mixing tank is intended to generate an exothermic chemical reaction and further enhance the rate of melting of the snow in the mixing tank.

The snow conversion system may further include an energy storage device configured to energize each of the conveyor apparatus, the fluid delivery arrangement, the mixer, the fluid nozzle, the auxiliary heating element, and the auxiliary injection arrangement.

The snow conversion system may additionally include an electronic controller configured to regulate and coordinate operation of each of the conveyor apparatus, the fluid delivery arrangement, the mixer, the fluid nozzle, the auxiliary heating element, the auxiliary injection arrangement, and the energy storage device.

The snow conversion system may further include a sensor in communication with the electronic controller and configured to detect a concentration of the chemical agent in the solution. In such an embodiment, the electronic controller may be configured to compare the detected concentration of the chemical agent with a threshold concentration value. The electronic controller may also be configured to introduce, i.e., inject, additional volume of the chemical agent into the solution when the detected concentration is below the threshold concentration value.

The mixing tank may include a thermal insulation layer configured to limit thermal losses from interior of the mixing tank to ambient environment.

The fluid delivery arrangement may include a reservoir configured to store the chemical agent, a fluid plumbing fluidly connecting the reservoir to the mixing tank via a valve configured to selectively regulate injection of the chemical agent into the mixing tank, and a fluid transfer pump configured to pressurize the chemical agent in the fluid plumbing.

Each of the mixing tank, the conveyor apparatus, the fluid delivery arrangement, the mixer, and the fluid nozzle may be mounted to a vehicle equipped with a plow configured to clear the snow from the access surface and direct the cleared snow to the conveyor apparatus.

The snow conversion system may additionally include a fluid discharge pump configured to dispense the solution of melted snow and the chemical agent out of the mixing tank through the fluid nozzle.

A motor vehicle and a method of snow conversion employing the aforementioned system are also disclosed.

The above features and advantages, and other features and advantages of the present disclosure, will be readily apparent from the following detailed description of the embodiment(s) and best mode(s) for carrying out the described disclosure when taken in connection with the accompanying drawings and appended claims.

DETAILED DESCRIPTION

Wintry inclement weather typically brings accumulation of snow and/or ice on exterior surfaces. Residential snow clearance and removal is generally accomplished with snow shovels after moderate snowfalls, while snow blowers are frequently used following heavy snowfalls or in the case of large driveways or other substantial surfaces. In other settings, such as commercial parking lots or driveways, companies with snow removal equipment are typically hired to clear and remove the snow. Removing ice is more difficult. Snow blowers are usually ineffective at clearing ice. To remove already accumulated ice or to prevent ice from forming, affected areas may be covered with salt or other substances.

Figure 1:
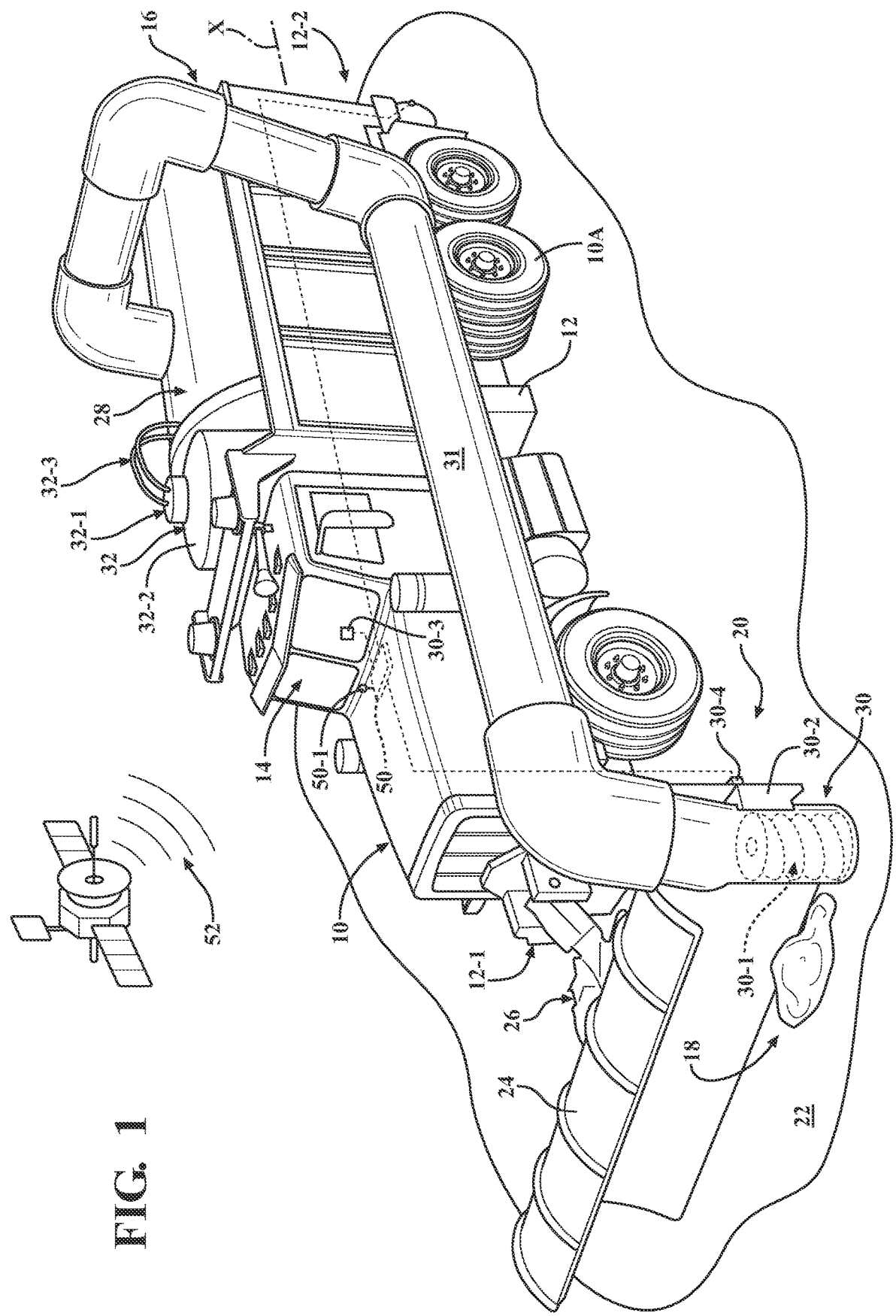
FIG. 1 is a schematic front perspective view of an embodiment of a truck embodiment of a motor vehicle equipped with a plow for clearing snow and a snow conversion system connected to a GPS and having a conveyor apparatus, a mixing tank, and a fluid delivery arrangement, according to the disclosure.
Figure 2:
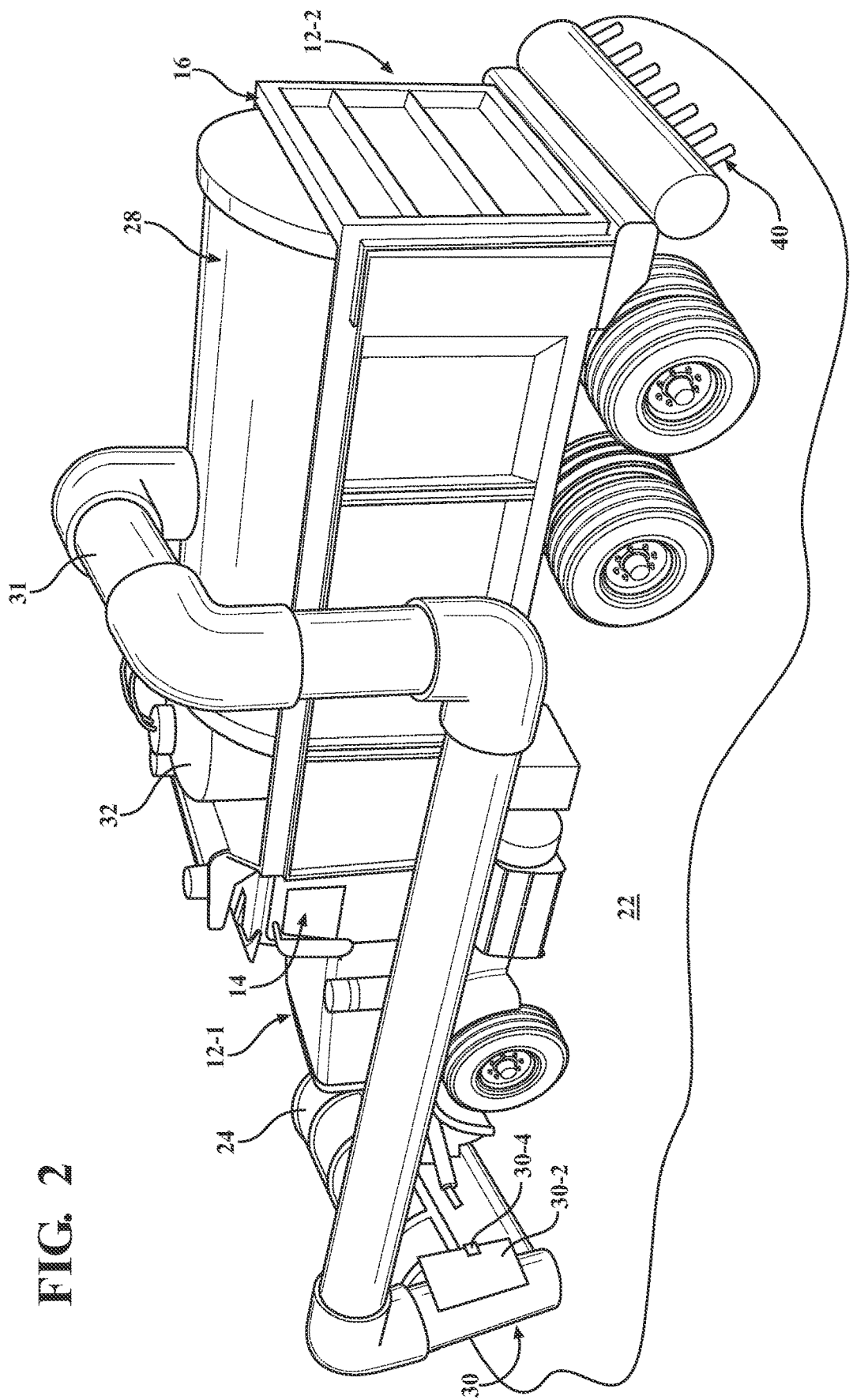
FIG. 2 is a schematic rear perspective view of the motor vehicle shown in FIG. 1 illustrating an arrangement of a fluid nozzle array, according to the disclosure.
Figure 3:
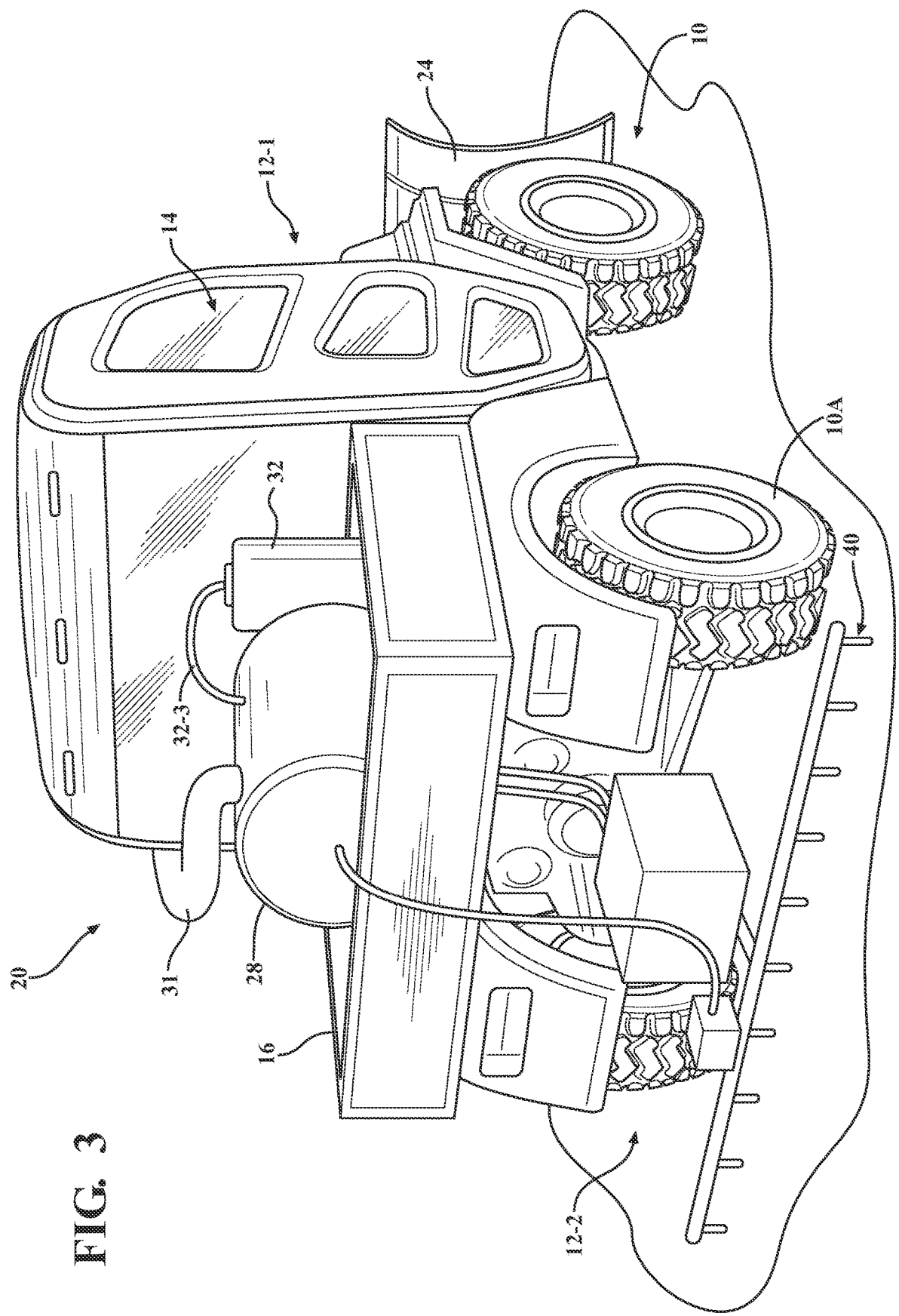
FIG. 3 is a schematic rear perspective view of a Utility Terrain Vehicle (UTV) embodiment of the motor vehicle equipped with a plow for clearing snow and the snow conversion system shown in FIG. 1.

Referring to the drawings, wherein like reference numbers refer to like components, FIGS. 1 and 2 show a mobile platform or motor vehicle 10. The vehicle 10 may, for example, be a truck (shown in FIGS. 1 and 2) or a Utility Terrain Vehicle (UTV) (shown in FIG. 3). The vehicle 10 may employ an internal combustion engine, a hybrid-electric, or a fully electric powertrain to motivate the vehicle, such as via transfer of power-source torque to one or more driven or road wheels 10A. The vehicle 10 includes a vehicle body structure 12 having a front end 12-1 and a rear end 12-2. The vehicle body structure 12 defines a passenger compartment 14 arranged proximate the front end 12-1 and a cargo storage compartment 16 arranged proximate the rear end 12-2. The passenger compartment 14 is generally adapted to accommodate the vehicle's operator, while the cargo storage compartment 16 is adapted to transport bulky cargo, such as building materials, tools, or machinery.

The vehicle 10 is specially adapted to clear snow 18 from drive lanes, entrances, parking lots, driveways, drive lanes, and other vital areas to keep residential or commercial property safe and open. The vehicle 10 includes a snow conversion system 20 for removal of snow 18 from an access surfaces 22 (e.g., parking lots, driveways, drive lanes, entrances and sidewalks). As shown, the snow conversion system 20 includes a plow 24 mounted via an appropriate linkage 26 to the front end 12-1 of the vehicle body structure 12. For example, as the subject surface is traversed by the motor vehicle 10, the plow 24 is configured to shift the snow 20 from the respective access surface 22 to a specifically designated area (not shown). The plow 24 may be moveable up/down and otherwise generally fixed relative to the vehicle body structure 12 or configured to articulate for shifting the snow 18 in a predetermined direction.

As shown in FIG. 2, the snow conversion system 20 includes a mixing tank 28 mounted to the rear end 12-2 of the vehicle body structure 12. The mixing tank 28 may have any geometric shape, for example a cylinder defined by a circumference C (shown in FIG. 4). As shown, the mixing tank 28 may be arranged along an axis X. However, the mixing tank 28 may be arranged in a different orientation, such as orthogonal or at an angle with respect to the axis X, as permitted by the available space in the cargo storage compartment 16. The mixing tank 28 has a wall 28-1 configured to enclose or define an interior space 28-2. The mixing tank 28 may be constructed from a tough, corrosion resistant material such as galvanized steel, coated aluminum, or engineered high-density plastic. As shown in FIG. 1, the snow conversion system 20 also includes a conveyor apparatus 30 fluidly connected, such as via a channel or a duct 31, to the mixing tank 28 and configured to transfer the snow 18 from the access surface 22 into the mixing tank. As shown, the plow 24 may be specifically configured, e.g., shaped and positioned, to clear the snow 18 from the access surface 22 and direct the cleared snow to the conveyor apparatus 30. As defined herein, the term "conveyor apparatus" generally denotes a device configured to transfer matter or material, such as snow 18 from the access surface 22 through a channel or a duct, to a distal location, such as the mixing tank 28.

As shown in FIG. 1, the conveyor apparatus 30 may include an auger 30-1 driven by an auger motor 30-2. The auger motor 30-2 may be directly connected to the auger 30-1. The auger motor 30-2 may be actuated via an appropriate solenoid (not shown) manually controllable via a switch 30-3 from inside the passenger compartment 14. The conveyor apparatus 30 may be equipped with a safety sensor-switch 30-4. The safety sensor-switch 30-4 may be configured to detect an obstruction in a path of the snow 18 between the plow 24 and the mixing tank 28 and command the auger 30-1 to automatically reverse its rotation by one to two revolutions upon detection of such an obstruction. Instead of the auger 30-1, the conveyor apparatus 30 may employ an alternative snow transfer device. For example, the conveyor apparatus 30 may use a vacuum generating device (not shown) configured to pull the snow 18 cleared by the plow 24, and then transfer the subject snow through a respective channel or duct to the mixing tank 28. The conveyor apparatus 30 may be mounted to the plow 24 to thereby maintain an appropriate relationship between the conveyor apparatus and the plow, regardless of the plow's articulated position. Furthermore, the conveyor apparatus 30 may be a self-contained "plug-in" device configured to interface with an electrical power storage and/or generation device, which will be described in detail below.

As shown in FIGS. 1-4, the snow conversion system 20 also includes a fluid delivery arrangement 32. The fluid delivery arrangement 32 is configured to inject a chemical agent 34 into the mixing tank 28 to thereby combine the chemical agent with the transferred snow 18 to promote melting of the snow in the mixing tank. The fluid delivery arrangement 32 may include an injector 32-1 to introduce the chemical agent 34 into the mixing tank 28. The fluid delivery arrangement 32 may additionally include a reservoir 32-2 configured to store the chemical agent 34. The fluid delivery arrangement 32 may additionally include fluid plumbing 32-3, such as a system of tubing and/or piping, fluidly connecting the reservoir 32-2 to the mixing tank 28 via a solenoid-controlled valve 32-4 (shown in FIG. 4). The fluid delivery arrangement 32 may further include a fluid transfer pump 32-5 (shown in FIG. 4) configured to pressurize the chemical agent 34 in and/or displace the chemical agent through the plumbing 32-3 into the mixing tank 28.

Combining of the chemical agent 34 with the snow 18 in the mixing tank 28 is intended to generate a solution 36 of the melted snow and the chemical agent. The chemical agent 34 may, for example, be a salt such as condensed calcium chloride or magnesium chloride, in which case the generated solution 36 will be a concentrated brine. Usage of such salts is intended to decrease the re-freezing point of the resultant solution 36 to a temperature significantly below −18° C. (0° F.), down to −34° C. (−30° F.). Additionally, the use of such salts may and produce an exothermic reaction to further aid in melting the snow 18 inside the mixing tank 28 and permit the solution 36 to have longer residual snow an ice melting effect when discharged onto the access surface 22, as will be described in detail below. Alternatively, the chemical agent 34 may be beet sugar or ethanol. The beet sugar mix may require a more concentrated solution 36 to dilute standing water on the access surface 22 and lower the solution's freeze point. In an additional alternative, ethanal may be added to the solution 36 to lower the solution's freeze point when dispensed on the access surface 22.

Figure 4:
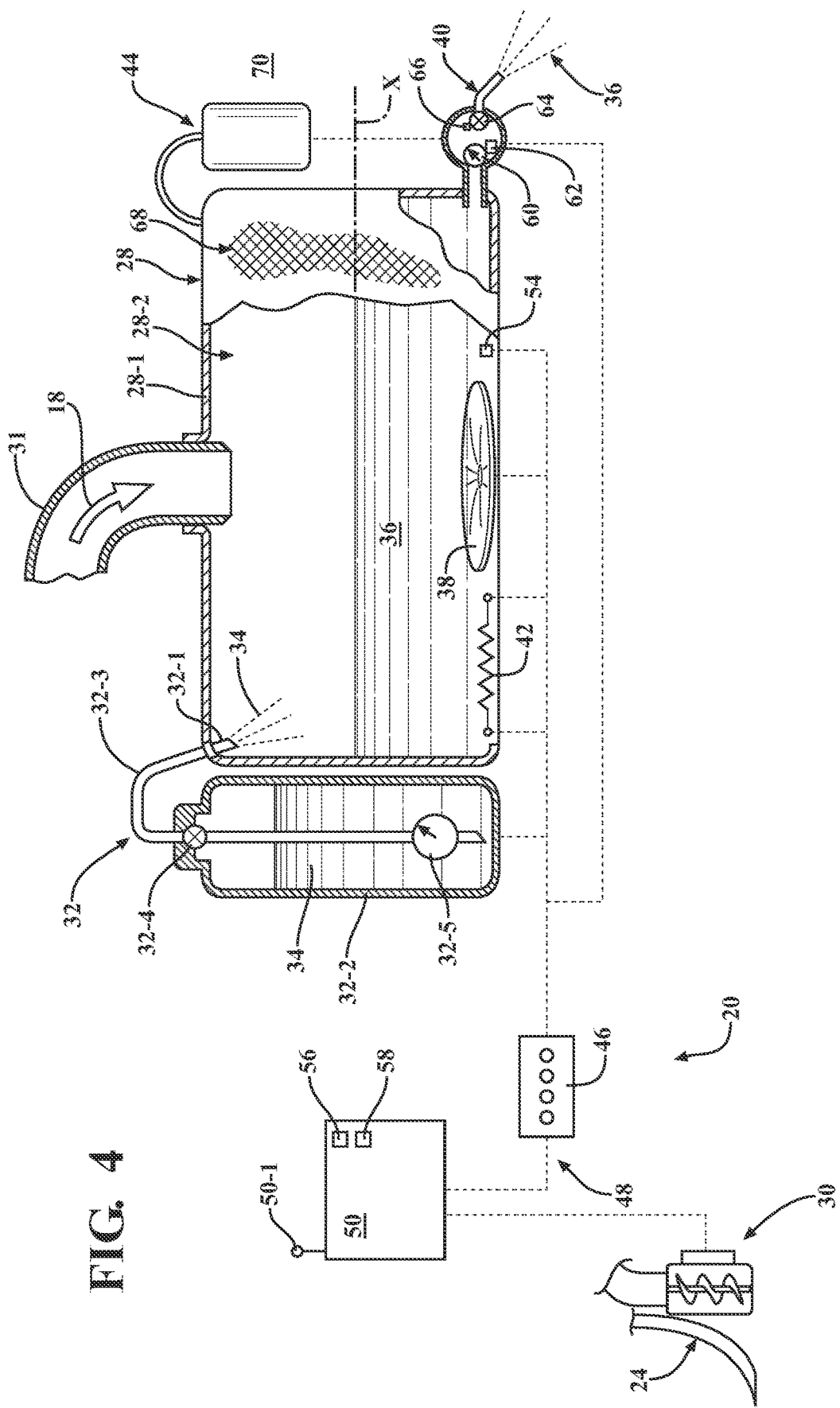
FIG. 4 is a schematic close-up, partially sectional view of the snow conversion system shown in FIGS. 1-3, including a mixer for a solution of snow and chemical agent, an auxiliary heating element, and an auxiliary injection arrangement, and one embodiment of the mixing tank construction, according to the disclosure.

As shown in FIG. 4, the snow conversion system 20 additionally includes a mixer 38 configured to agitate and mix the snow 18 and the injected chemical agent 34 in the mixing tank 28 and thereby further facilitate melting of the snow inside the tank. The snow conversion system 20 further includes one or more fluid nozzles 40 in fluid communication with the mixing tank 28. The fluid nozzle(s) 40 may be mounted to the rear end 12-2 of the vehicle body structure 12. The fluid nozzle(s) 40 are configured to dispense the solution 36 of melted snow and the chemical agent onto the access surface 22 at the rear end 12-2 of the vehicle to thereby provide de-icing and/or anti-icing of the access surface 22. In an array of nozzles 40, each nozzle may have a fixed spray pattern to ensure appropriate coverage of the access surface 22 behind the vehicle 10. Alternatively, the nozzle(s) 40 may have an adjustable spray pattern permitting the nozzle arrangement to be adapted to the width of a particular access surface. For example, the spray pattern delivered by the array of nozzles 40 may be adjusted to provide coverage in the range of 8-24 feet across, e.g., substantially orthogonal to the axis X.

With continued reference to FIG. 4, the mixing tank 28 may include an auxiliary heating element 42 configured to apply additional thermal energy to the solution 36 of melted snow and chemical agent. The auxiliary heating element 42 may be configured as a resistive wire, ceramic or semiconductor, or a thick film device printed on a thin substrate, such as metal, ceramic, or mica sheet, and effect zonal heating within the mixing tank 28. The above addition of thermal energy is intended to enhance a rate of melting of the snow 18 inside the mixing tank 28. In the embodiment where the injected chemical agent 34 is condensed magnesium chloride, the snow conversion system 20 may additionally include an auxiliary injection arrangement 44 configured to inject iron oxide into the mixing tank 28. The iron oxide introduced by the auxiliary injection arrangement 44 is intended to react with magnesium in the already injected magnesium chloride and thereby generate an exothermic chemical reaction. The energy released by the exothermic chemical reaction due to injection of the iron oxide would further enhance the rate of melting of the snow 18 inside the mixing tank 28.

With resumed reference to FIG. 1, the snow conversion system 20 may also include an energy storage device 46, such as one or more batteries. The energy storage device 46 may be a stand-alone device or part of an electrical system 48 of the vehicle 10. The energy storage device 46 is configured to provide electrical power and energize each of the conveyor apparatus 30, the fluid delivery arrangement 32, the mixer 38, the fluid nozzle 40, the auxiliary heating element 42, and the auxiliary injection arrangement 44. The snow conversion system 20 may further include an electronic controller 50 (shown in FIGS. 1 and 4) in operative communication with each of the conveyor apparatus 30, the fluid delivery arrangement 32, the mixer 38, the fluid nozzle 40, the auxiliary heating element 42, and the auxiliary injection arrangement 44.

For such a purpose, the controller 50 may be configured, i.e., constructed and programmed, to regulate operation of the snow conversion system 20, and thereby automatically coordinate operation of the disclosed components of the system to affect clearing and removal of snow 18 from respective access surfaces 22. The electronic controller 50 may include an antenna 50-1 for a two-way communication with a global positioning satellite (GPS) 52. In such an embodiment, the snow conversion system 20 may be further configured to regulate the snow conversion system 20 and the movement of the motor vehicle 10 across the access surface 22 autonomously, such as using the GPS 52 connection with the electronic controller 50. The electronic controller 50 includes a processor and tangible, non-transitory memory, which includes instructions for operation of the snow conversion system 20 programmed therein. The memory may be an appropriate recordable medium that participates in providing computer-readable data or process instructions. Such a recordable medium may take many forms, including but not limited to non-volatile media and volatile media.

Non-volatile media for the electronic controller 50 may include, for example, optical or magnetic disks and other persistent memory. Volatile media may include, for example, dynamic random access memory (DRAM), which may constitute a main memory. Such instructions may be transmitted by one or more transmission medium, including coaxial cables, copper wire and fiber optics, including the wires that comprise a system bus coupled to a processor of a computer, or via a wireless connection. Memory of the electronic controller 50 may also include a flexible disk, hard disk, magnetic tape, another magnetic medium, a CD-ROM, DVD, another optical medium, etc. The electronic controller 50 may be configured or equipped with other required computer hardware, such as a high-speed clock, requisite Analog-to-Digital (A/D) and/or Digital-to-Analog (D/A) circuitry, input/output circuitry and devices (I/O), as well as appropriate signal conditioning and/or buffer circuitry. Algorithms required by the electronic controller 50 or accessible thereby may be stored in the memory and automatically executed to automatically clear and remove snow 18 from selected access surfaces 22.

The electronic controller 50 may be configured to automatically control injection of the chemical agent 34 into the mixing tank 28 via operative communication with the fluid delivery arrangement 32. To automatically control injection of the chemical agent 34, the electronic controller 50 may be programmed to inject the chemical agent into the mixing tank 28 in response to the conveyor apparatus 30 being operated to transfer the snow 18 from the access surface 22. To affect automatic operation of the fluid delivery arrangement 32, the snow conversion system 20 may additionally include a sensor 54 in communication with the electronic controller 50. The sensor 54 is configured to detect a concentration 56 of the chemical agent 34 in the solution 36, e.g., salinity of the brine. For its part, the electronic controller 50 may be programmed to compare the detected concentration 56 of the chemical agent 34 with a threshold concentration value 58 or a target range. The electronic controller 50 may be programmed to regulate operation of the fluid delivery arrangement 32, such as via the valve 32-4, and introduce, i.e., inject, additional volume of the chemical agent 34 into the solution 36 when the detected concentration 56 falls below the threshold concentration value 58 or the target range. The chemical agent 34 may be periodically added into the mixing tank 28 as the vehicle 10 traverses the access surface 22 and the conveyor apparatus 30 continues to transfer plowed snow 18 into the tank. The reservoir 32-2 may be replenished with additional chemical agent 34 as needed.

As shown in FIG. 2, the snow conversion system 20 may additionally include a fluid discharge pump 60 in communication with the mixing tank 28. The fluid discharge pump 60 may be driven by an electric motor 62, for example, interfaced with the vehicle's electrical system 48. Generally, removing ice from access surfaces is more difficult than removing snow. The fluid discharge pump 60 is configured to dispense the solution 36 of melted snow and the chemical agent out of the mixing tank 28 through the fluid nozzle(s) 40 onto the access surface 22, such as behind the vehicle 10. Dispensing of the solution 36 onto the access surface 22 may be used to affect de-icing, i.e., removal of existing snow, ice, or frost from the access surface 22, and/or anti-icing, i.e., prevention of or delay in the formation and adhesion of ice and snow to the access surface (usually shortly before the beginning of a snowstorm). Dispensing of the solution 36 through the fluid nozzle(s) 40 may be controlled using a 2-way valve(s) 64. The electronic controller 50 may be programmed to regulate the 2-way valve(s) 64 via suitable relay(s) 66.

Figure 5:
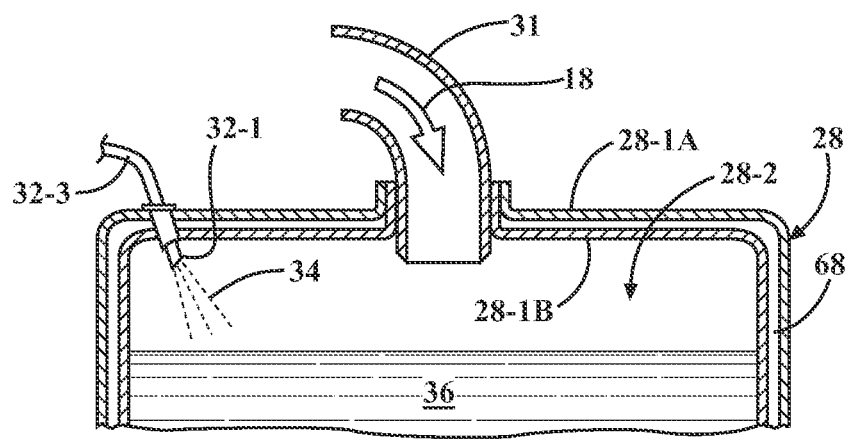
FIG. 5 is a schematic close-up, partially sectional view of an alternative construction of the mixing tank.

As shown in FIGS. 4 and 5, the mixing tank 28 may include a thermal insulation layer 68 arranged on an outer surface of the tank wall 28-1, surrounding the tank along the axis X, and intended to limit thermal losses from the interior space 28-2 and the solution 36 to ambient environment 70. The thermal insulation layer 68 may be a specific coating or a wrap arranged on the outer surface of the wall 28-1 (shown in FIG. 4). Alternatively, the mixing tank 28 may have a double wall construction, i.e., wall 28-1A and wall 28-1B, with the thermal insulation layer 68 being a body of air trapped between the two walls (shown in FIG. 5). The snow conversion system 20 is particularly well adapted to an electric vehicle 10, such as the UTV shown in FIG. 3, where high drive torque of the vehicle's traction motor is beneficial for effective pushing of the snow 18, and the vehicle's on-board electrical power may be utilized to operate the described components of the snow conversion system. After the plow 24 pushes the snow 18 close to an object, such as a wall or a door of a building structure, majority of the snow cleared by the plow may be picked up by the conveyor apparatus 30. Accordingly, the snow conversion system 20 may be particularly useful in minimizing the need for back dragging with the plow 24.

Figure 6:
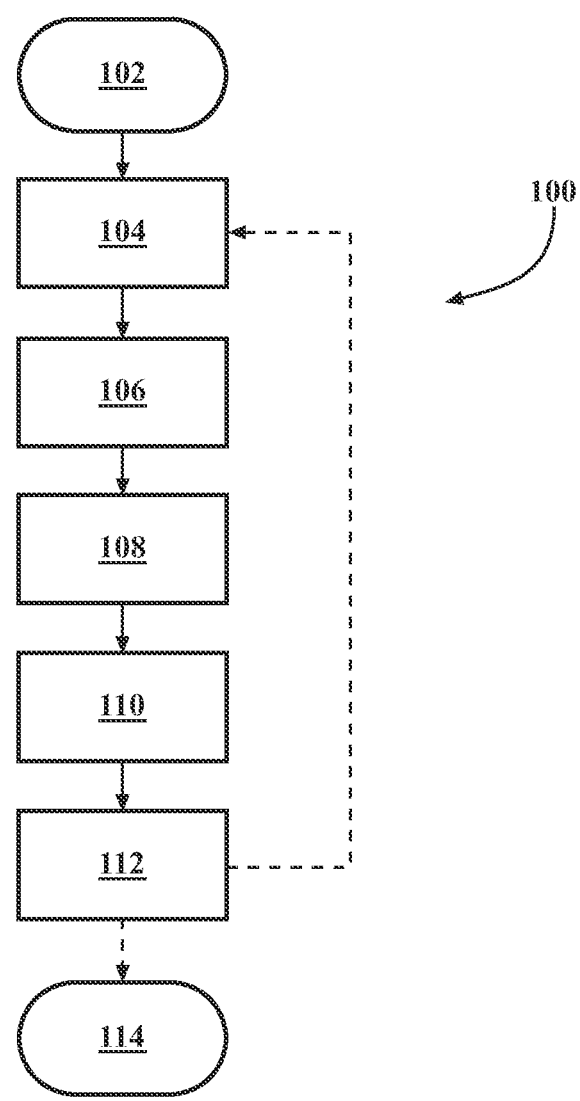
FIG. 6 illustrates a method of snow conversion using the system shown in FIGS. 1-5.

FIG. 6 depicts a method 100 of snow conversion adapted for clearing and removal of snow 18 from an access surface 22 and described below with reference to the snow conversion system 20 shown in FIGS. 1-5. The method 100 commences in frame 102 with the snow conversion system 20 being activated by an operator, such as via the switch 30-3 from the passenger compartment 14 of the motor vehicle 10. Following frame 102, the method advances to frame 104. In frame 104, the method includes clearing the snow 18, via the plow 24 mounted to the motor vehicle 10, from the access surface 22. In frame 104 the method additionally includes directing the cleared snow 18, via the plow 24, to the conveyor apparatus 30 regulated by the electronic controller 50. Following frame 104, the method advances to frame 106. In frame 106, the method includes transferring the cleared snow 18, via the conveyor apparatus 30, into the mixing tank 28.

From frame 106, the method moves on to frame 108. In frame 108, the method includes injecting, in response to the transferring of the cleared snow 18 (for example, upon activation of the auger motor 30-2 or an appropriate signal from the sensor 54), via the fluid delivery arrangement 32 regulated by the electronic controller 50, the chemical agent 34 into the mixing tank 28. Injecting the chemical agent 34 into the mixing tank 28 combines the chemical agent with the transferred snow 18 to generate the solution 36 of the melted snow and the chemical agent. After frame 108 the method proceeds to frame 110. In frame 110, the method includes agitating and mixing, via the mixer 38 regulated by the electronic controller 50, the snow 18 and the injected chemical agent 34 in the mixing tank 28 to facilitate melting of the snow in the mixing tank.

In frame 110, the method may also include activating the auxiliary heating element 42, via the electronic controller 50, to thereby enhance the rate of melting of the snow 18 in the mixing tank 28. Additionally, in frame 110 the method may include activating the auxiliary injection arrangement 44, via the electronic controller 50, to thereby generate an exothermic chemical reaction and further enhance the rate of melting of the snow 18 in the mixing tank 28. Furthermore, in frame 110 the method may include detecting, via the sensor 54, the concentration 56 of the chemical agent 34 in the solution 36. As described above with respect to FIGS. 1-5, the method may then involve comparing, via the electronic controller 50, the detected concentration 56 with the threshold concentration value 58 and introducing additional volume of the chemical agent 34 into the solution 36 when the detected concentration is below the threshold concentration value 58.

Following frame 110, the method proceeds to frame 112. In frame 112, the method includes dispensing, via the fluid nozzle 40 in fluid communication with the mixing tank 28 and regulated by the electronic controller 50, the solution 36 onto the access surface 22, such as behind the motor vehicle 10, to thereby provide de-icing and/or anti-icing of the access surface. Alternatively, the mixing tank 28 may be prefilled with the solution 36, such that the solution could be dispensed onto the access surface 22 to commence de-icing and/or anti-icing of the access surface prior to removal of the snow 18. The prefill of the mixing tank 28 may be accomplished prior to frame 104. The method 100 may operate while the motor vehicle 10 is traversing the access surface 22 and the plow 24 continues to clear the snow 18 via continuously looping back from frame 112 to frame 104. Alternatively, the method may conclude in frame 114, once the snow conversion system 20 is deactivated by the system operator, such as via the switch 30-3 from the passenger compartment 14 of the motor vehicle 10.

The detailed description and the drawings or figures are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment may be combined with one or a plurality of other desired characteristics from other embodiments, resulting in other embodiments not described in words or by reference to the drawings. Accordingly, such other embodiments fall within the framework of the scope of the appended claims.

What is claimed is:

1. A snow conversion system for removal of snow from an access surface, the system comprising:
    a mixing tank;
    a conveyor apparatus fluidly connected to the mixing tank and configured to transfer the snow from the access surface into the mixing tank;
    a fluid delivery arrangement configured to inject magnesium chloride into the mixing tank to combine the magnesium chloride with the transferred snow, melt the transferred snow, and thereby generate a solution of the melted snow and the magnesium chloride having a freezing point lower than water;
    a mixer configured to agitate and mix the transferred snow and the injected magnesium chloride in the mixing tank and thereby further facilitate melting of the snow in the mixing tank;
    a fluid nozzle in fluid communication with the mixing tank and configured to dispense the solution of the melted snow and the magnesium chloride onto the access surface to thereby provide de-icing and anti-icing of the access surface;
    an auxiliary heating element arranged inside the mixing tank and configured to add thermal energy to the solution of the melted snow and magnesium chloride and thereby enhance a rate of melting of the snow in the mixing tank; and
    an auxiliary injection arrangement configured to inject iron oxide into the mixing tank to react with magnesium in the injected magnesium chloride and thereby generate an exothermic chemical reaction and further enhance the rate of melting of the snow in the mixing tank.

2. The snow conversion system of claim 1, further comprising an electronic controller configured to regulate and coordinate operation of each of the conveyor apparatus, the fluid delivery arrangement, the mixer, the fluid nozzle, the auxiliary heating element, and the auxiliary injection arrangement.

3. The snow conversion system of claim 2, further comprising a sensor in communication with the electronic controller and configured to detect a concentration of the magnesium chloride in the solution, wherein the electronic controller is configured to:
    compare the detected concentration of the magnesium chloride with a threshold concentration value, and
    inject an additional volume of the magnesium chloride into the solution when the detected concentration is below the threshold concentration value.

4. The snow conversion system of claim 1, wherein the fluid delivery arrangement includes:
    a reservoir configured to store the chemical agent;
    a fluid plumbing fluidly connecting the reservoir to the mixing tank via a valve configured to selectively regulate injection of the magnesium chloride into the mixing tank; and
    a fluid transfer pump configured to pressurize the magnesium chloride in the fluid plumbing.

5. The snow conversion system of claim 1, wherein each of the mixing tank, the conveyor apparatus, the fluid delivery arrangement, the mixer, and the fluid nozzle is mounted to a vehicle equipped with a plow configured to clear the snow from the access surface and direct the cleared snow to the conveyor apparatus.

6. The snow conversion system of claim 1, further comprising a fluid discharge pump configured to dispense the solution of the melted snow and the magnesium chloride out of the mixing tank through the fluid nozzle.

7. A motor vehicle comprising:
    a power-source configured to generate a power-source torque for driving the motor vehicle;
    a vehicle body structure defined by a front end and a rear end;
    a plow mounted to the vehicle body structure and configured to clear snow from an access surface traversed by the motor vehicle; and
    a snow conversion system for removal of the snow, the system including:
        a mixing tank mounted to the body structure;
        a conveyor apparatus mounted proximate the front end of the vehicle body structure, fluidly connected to the mixing tank, and configured to receive the snow from the plow and transfer the snow into the mixing tank;
        a fluid delivery arrangement configured to inject a magnesium chloride into the mixing tank to combine the magnesium chloride with the transferred snow, melt the transferred snow, and thereby generate a solution of the melted snow and the magnesium chloride having a freezing point lower than water;
        a mixer configured to agitate and mix the snow and the injected magnesium chloride in the mixing tank and thereby further facilitate melting of the snow in the mixing tank;
        a fluid nozzle mounted proximate the rear end of the vehicle body structure in fluid communication with the mixing tank and configured to dispense the solution of the melted snow and the magnesium chloride onto the access surface to thereby provide de-icing and anti-icing of the access surface;
        a sensor configured to detect a concentration of the magnesium chloride in the solution;
        an auxiliary heating element arranged inside the mixing tank and configured to add thermal energy to the solution of the melted snow and magnesium chloride and thereby enhance a rate of melting of the snow in the mixing tank;
        an auxiliary injection arrangement configured to inject iron oxide into the mixing tank to react with magnesium in the injected magnesium chloride and thereby generate an exothermic chemical reaction and further enhance the rate of melting of the snow in the mixing tank; and
        an electronic controller in communication with the sensor and configured to:
        compare the detected concentration of the chemical agent magnesium chloride with a threshold concentration value, and inject an additional volume of the chemical agent magnesium chloride into the solution when the detected concentration is below the threshold concentration value.

8. The motor vehicle of claim 7, wherein the fluid delivery arrangement includes:
   a reservoir configured to store the magnesium chloride;
   a fluid plumbing fluidly connecting the reservoir to the mixing tank via a valve configured to selectively regulate injection of the magnesium chloride into the mixing tank; and
   a fluid transfer pump configured to pressurize the magnesium chloride in the fluid plumbing.

9. The motor vehicle of claim 7, wherein the snow conversion system additionally includes a fluid discharge pump configured to dispense the solution of the melted snow and the magnesium chloride out of the mixing tank through the fluid nozzle.

10. A method of snow conversion comprising:
    clearing the snow, via a plow, from an access surface and directing the snow, via the plow, to a conveyor apparatus fluidly connected to a mixing tank;
    transferring the snow, via an electronic controller in operative communication with the conveyor apparatus, into the mixing tank;
    injecting, in response to the transferring of the snow, via the electronic controller in operative communication with a fluid delivery arrangement, a magnesium chloride into the mixing tank to combine the magnesium chloride with the transferred snow and melt the transferred snow, and thereby generate a solution of the melted snow and the magnesium chloride having a freezing point lower than water;
    agitating and mixing, via the electronic controller in operative communication with a mixer, the transferred snow and the injected magnesium chloride in the mixing tank to further facilitate melting of the snow in the mixing tank;
    activating, via the electronic controller, an auxiliary heating element arranged inside the mixing tank to add thermal energy to the solution of melted snow and magnesium chloride and thereby enhance a rate of melting of the snow in the mixing tank;
    activating, via the electronic controller, an auxiliary injection arrangement to inject iron oxide into the mixing tank to react with magnesium in the injected magnesium chloride and thereby generate an exothermic chemical reaction to further enhance the rate of melting of the snow in the mixing tank; and
    dispensing, via the electronic controller in operative communication with a fluid nozzle in fluid communication with the mixing tank, the solution of melted snow and the magnesium chloride onto the access surface to thereby provide de-icing and anti-icing of the access surface.

11. The method of claim 10, further comprising a sensor in communication with the electronic controller and configured to detect a concentration of the magnesium chloride in the solution, the method further comprising:
    comparing the detected concentration of the magnesium chloride with a threshold concentration value, and injecting an additional volume of the magnesium chloride into the solution when the detected concentration is below the threshold concentration value.

12. The method of claim 10, wherein the fluid delivery arrangement includes:
    a reservoir configured to store the magnesium chloride;
    a fluid plumbing fluidly connecting the reservoir to the mixing tank via a valve in communication with the electronic controller and configured to selectively regulate injection of the magnesium chloride into the mixing tank; and
    a fluid transfer pump configured to pressurize the magnesium chloride in the fluid plumbing;
    the method further comprising operating the valve, via the electronic controller, to selectively regulate injection of the magnesium chloride into the mixing tank.

13. The method of claim 10, further comprising a fluid discharge pump configured to dispense the solution of melted snow and the magnesium chloride out of the mixing tank through the fluid nozzle, the method further comprising operating the discharge pump, via the electronic controller, to dispense the solution of melted snow and the magnesium chloride out of the mixing tank through the fluid nozzle.

\* \* \* \* \*

UNITED STATES PATENT AND TRADEMARK OFFICE
CERTIFICATE OF CORRECTION

| | | |
|---|---|---|
| PATENT NO. | : 12,104,340 B2 | Page 1 of 1 |
| APPLICATION NO. | : 17/340194 | |
| DATED | : October 1, 2024 | |
| INVENTOR(S) | : Jerry Carducci | |

It is certified that error appears in the above-identified patent and that said Letters Patent is hereby corrected as shown below:

In the Claims

Column 10, Line 35, in Claim 7, "a fluid delivery arrangement configured to inject a magnesium chloride" should read --a fluid delivery arrangement configured to inject magnesium chloride--

Column 10, Line 66, in Claim 7, "compare the detected concentration of the chemical agent magnesium chloride" should read --compare the detected concentration of the magnesium chloride--

Column 11, Line 1, in Claim 7, "inject an additional volume of the chemical agent magnesium chloride" should read --inject an additional volume of the magnesium chloride--

Signed and Sealed this
Seventeenth Day of December, 2024

Derrick Brent
*Acting Director of the United States Patent and Trademark Office*